(12) United States Patent
Kanungo et al.

(10) Patent No.: US 9,823,942 B2
(45) Date of Patent: Nov. 21, 2017

(54) VIRTUAL MACHINE DISCOVERY AND IDENTIFICATION

(71) Applicant: Extreme Networks, Inc., San Jose, CA (US)

(72) Inventors: Biswajit Kanungo, San Jose, CA (US); Pramod Bangalore, San Ramon, CA (US)

(73) Assignee: Avaya Inc., Basking Ridge, NJ (US)

( * ) Notice: Subject to any disclaimer, the term of this patent is extended or adjusted under 35 U.S.C. 154(b) by 868 days.

(21) Appl. No.: 13/763,603

(22) Filed: Feb. 8, 2013

(65) Prior Publication Data

US 2014/0229933 A1 Aug. 14, 2014

(51) Int. Cl.
*G06F 9/455* (2006.01)
(52) U.S. Cl.
CPC ........... *G06F 9/45558* (2013.01); *G06F 2009/45591* (2013.01)

(58) Field of Classification Search
CPC .................................... G06F 9/45558
USPC ........................................... 718/1
See application file for complete search history.

(56) References Cited

U.S. PATENT DOCUMENTS

| 2012/0011503 | A1* | 1/2012 | Filali-Adib et al. ......... 718/1 |
| 2013/0061225 | A1* | 3/2013 | Nakagawa ................... 718/1 |
| 2013/0298184 | A1* | 11/2013 | Ermagan et al. ........... 726/1 |
| 2014/0157260 | A1* | 6/2014 | Balani et al. .............. 718/1 |
| 2014/0222745 | A1* | 8/2014 | Deng et al. .............. 706/47 |

OTHER PUBLICATIONS

D. Johnson, C. Perkins, J. Arkko, Mobility Support in IPv6, IETF RFC 3775, Jun. 2004.*
T. Narten, E. Nordmark, W. Simpson, "Neighbor Discovery for IP Version 6 (IPv6)", IETF RFC 2461, Jun. 2004.*

* cited by examiner

*Primary Examiner* — Charlie Sun
(74) *Attorney, Agent, or Firm* — IP Spring

(57) ABSTRACT

Methods, systems and computer readable media for virtual machine discovery and identification are described.

19 Claims, 3 Drawing Sheets

VIRTUAL MACHINE DISCOVERY AND IDENTIFICATION

RELATED APPLICATIONS

This application claims the benefit of U.S. Provisional Application No. 61/693,323, entitled "Network Device Manager, Virtual Machine Discovery and Identification, And Virtual Machine Software Licensing" and filed on Aug. 26, 2012, which is incorporated herein by reference in its entirety.

TECHNICAL FIELD

Embodiments relate generally to computer networks, and more particularly, to methods, systems and computer readable media for virtual machine discovery and identification.

BACKGROUND

Some computing environments and configurations include one or more virtual machines (VMs) operating on a hardware server. Network management personnel or systems may need to perform a discovery from time to time to learn about elements in the network. Many of the traditional, non-virtual network elements may have static parameters. However, in a virtualized environment, VMs may not be static and may change parameters (or characteristics) over time (e.g., a VM may move from one physical server to a different physical server).

A problem can occur in a virtualized environment when VMs change parameters between the times that discovery operations are performed. The same VM may be added two times to a list of network elements, once during the first discovery operation and then a second time when a subsequent discovery operation is performed. Also, some conventional discovery protocols such as link level discovery protocol (IEEE 802.1ab) and CDP may not handle discovery of virtual machines.

Thus, there may be a need for network management systems to have an ability to discover and identify virtual entities (e.g., virtual machines) even when a parameter associated with the virtual entity changes.

Embodiments were conceived in light of the above mentioned needs, problems and/or limitations, among other things.

SUMMARY

One or more embodiments can include a method for discovering and identifying virtual entities. The method can include receiving, at one or more processors, information from a virtual entity, the information including one or more of a time stamp, an IP address, a MAC address, and a name (e.g., DNS name or best name). The method can also include comparing, at the one or more processors, the information received from the virtual entity to stored virtual entity information. The method can further include, when a number of items of information received from the virtual entity match items of the stored virtual entity information, determining that the virtual entity matches the virtual entity associated with the stored virtual entity information. The method can also include, when a number of items of information received from the virtual entity do not match items of the stored virtual entity information, determining that the virtual entity is an unknown virtual entity and storing the virtual entity information.

Some implementations can include a method for discovering and identifying virtual machines. The method can include receiving, at one or more processors, information from a virtual machine, the information including one or more of a time stamp, an IP address, a MAC address and a DNS name. The method can also include comparing, at the one or more processors, the information received from the virtual machine to stored virtual machine information retrieved from a database. When a number of items of information received from the virtual machine match items of the stored virtual entity information, the method can include determining that the virtual machine matches a virtual machine associated with the stored virtual machine information. When a number of items of information received from the virtual machine do not match items of the stored virtual machine information, the method can include determining that the virtual machine is an unknown virtual machine and adding the virtual machine information to the database and associating the stored information with the virtual machine.

Some implementations can include a system for discovering and identifying virtual machines, the system can include one or more processors configured to perform operations. The operations can include receiving, at one or more processors, information from a virtual machine, and comparing, at the one or more processors, the information received from the virtual machine to stored virtual machine information retrieved from a database.

When a number of items of information received from the virtual machine match items of the stored virtual entity information, the operations can include determining that the virtual machine matches a virtual machine associated with the stored virtual machine information. When a number of items of information received from the virtual machine do not match items of the stored virtual machine information, the operations can also include determining that the virtual machine is an unknown virtual machine and adding the virtual machine information to the database and associating the stored information with the virtual machine.

Some implementations a nontransitory computer readable medium having stored thereon software instructions that, when executed by a processor, cause the processor to perform operations. The operations can include receiving, at one or more processors, information from a virtual machine, and comparing, at the one or more processors, the information received from the virtual machine to stored virtual machine information retrieved from a database.

When a number of items of information received from the virtual machine match items of the stored virtual entity information, the operations can include determining that the virtual machine matches a virtual machine associated with the stored virtual machine information. When a number of items of information received from the virtual machine do not match items of the stored virtual machine information, the operations can also include determining that the virtual machine is an unknown virtual machine and adding the virtual machine information to the database and associating the stored information with the virtual machine.

The method (or operations) can also include determining whether a unique identifier for the virtual machine is available from a hypervisor associated with the virtual machine and, when a unique identifier is available, receiving the unique identifier and storing the unique identifier in a database record associated with the virtual machine. The method can further include generating a unique identifier, when a unique identifier is not available from the hypervisor, and storing the generated unique identifier at a known location in the virtual machine. The generating can include using a hash function. The information can include one or more of a time stamp, an IP address, a MAC address and a DNS name

DETAILED DESCRIPTION

Figure 1:
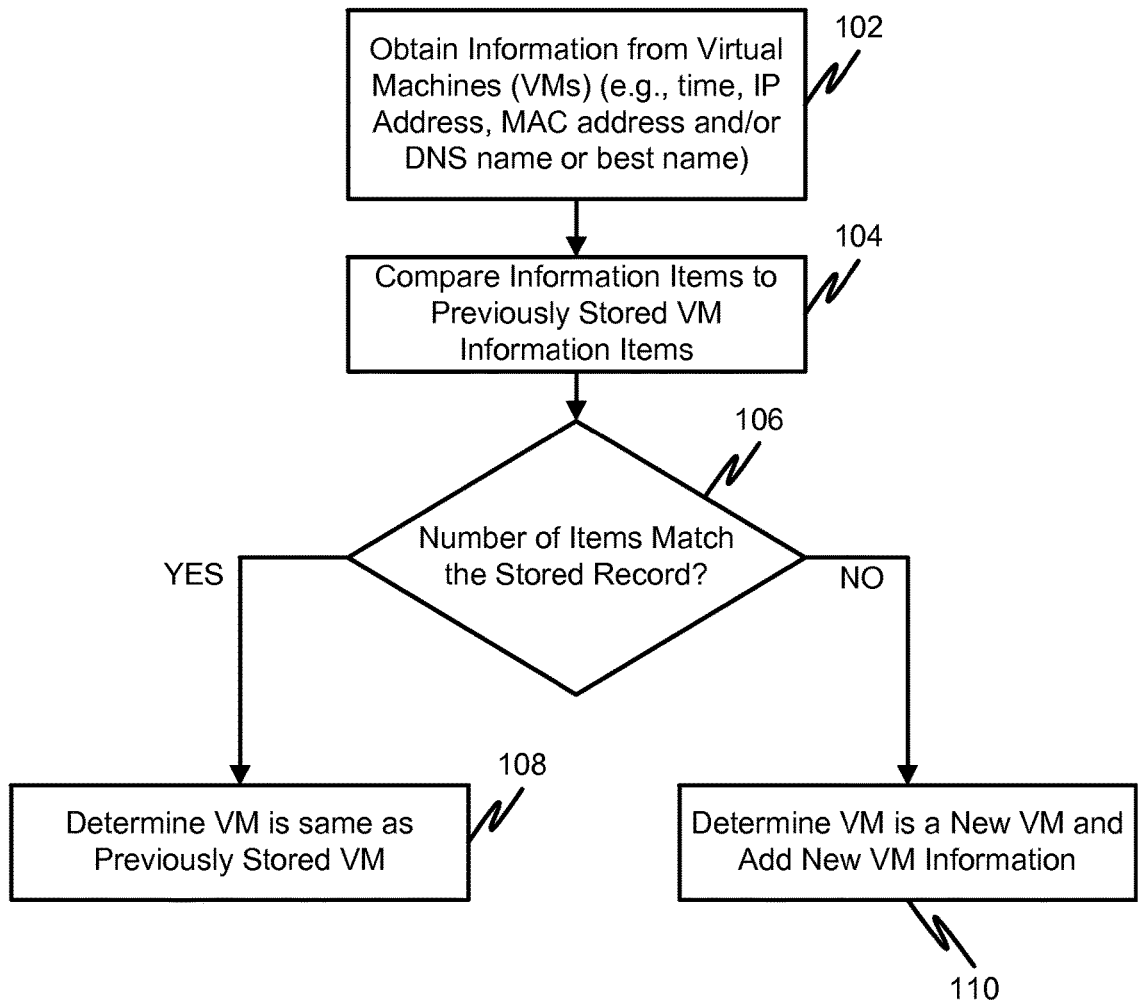
FIG. 1 is a flowchart of an example method for virtual machine discovery and identification in accordance with at least one embodiment.

FIG. 1 is a flowchart of an example method for virtual machine discovery and identification in accordance with at least one embodiment. Processing begins at 102 where information is obtained (or received) from a virtual entity (e.g., a virtual machine). The information can include, but is not limited to, a time stamp, an IP address, a MAC address (virtual and/or physical), a unique hypervisor ID (UUID) and/or a DNS name (or best name).

For example, a virtual machine discovery and identification system can locate a physical host and interrogate the host to learn about interfaces. The virtual machine discovery and identification system can perform a combination of a port scan and inspecting interfaces to determine if a virtual machine is present and to learn the attributes (or parameters) of each virtual machine in the host. Processing continues to 104.

At 104, the information received from the virtual entity is compared to previously stored information regarding virtual entities. Processing continues to 106.

At 106, the system can determine whether a number of items (e.g., any two items) of information obtained from the virtual entity match stored items of information. If a number of items match, processing continues to 108. If a number of items do not match, processing continues to 110. The criteria for matching, such as the number of parameters and which parameters must match can be configured manually, automatically or both. Also, the determination of matching can include determining that two values are within a given range from each other. The parameter values do not necessarily have to be identical for the system to determine that the parameters match the same VM.

At 108, the system can determine that the virtual entity information was received from is the same as a virtual entity previously stored in the system. In such cases, the virtual machine identification and discovery system may update the stored virtual machine information, but does not add a new entry for the virtual machine.

At 110, the system can determine that the virtual entity from which information was received is a new entity and can store the information in a record created to correspond to that entity. It will be appreciated that 102-110 can be repeated in whole or in part in order to accomplish a contemplated virtual machine discovery and identification process.

Figure 2:
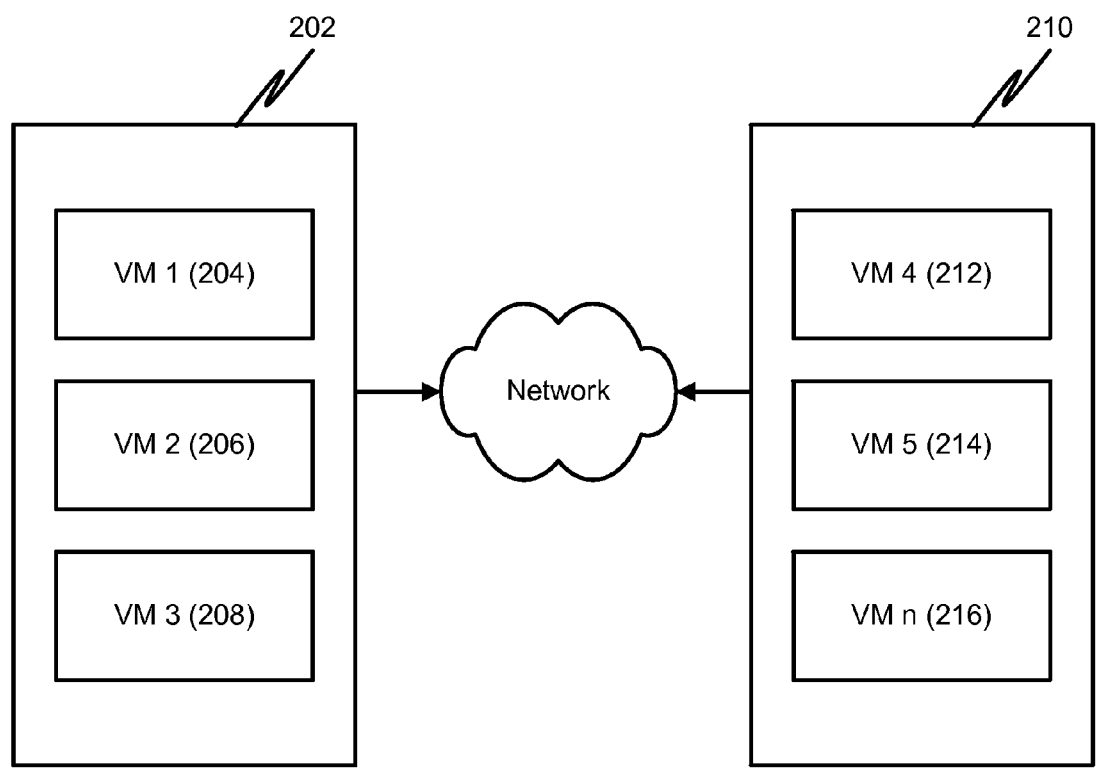
FIG. 2 is a flowchart of an example method for virtual machine software licensing in accordance with at least one embodiment.

FIG. 2 is a diagram of an example network environment in which two physical servers (202 and 210) each contain a group of virtual machines (204-208 and 212-216, respectively). A virtual machine discovery and identification system as described herein can be used to discover and identify virtual machines in configurations similar to that shown in FIG. 2.

Figure 3:
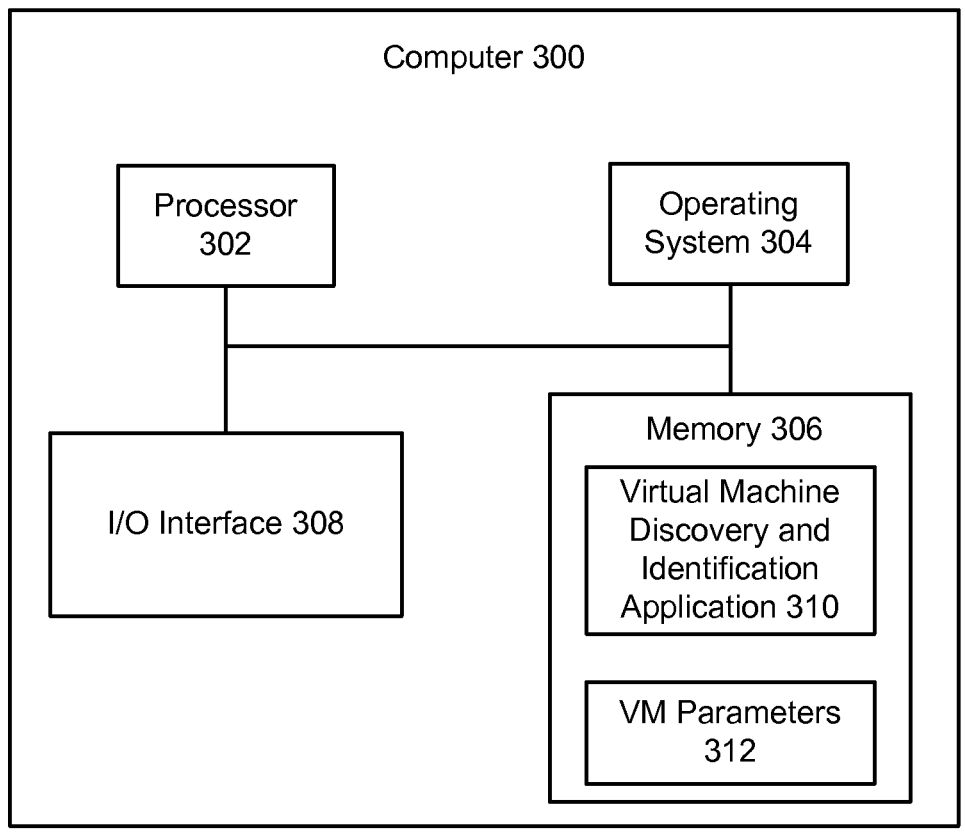
FIG. 3 is an example network equipment physical view in accordance with at least one embodiment.

FIG. 3 is a diagram of an example computer 300 that can be used for virtual machine discovery and identification in accordance with some implementations. The computer 300 includes a processor 302, operating system 304, memory 306 and I/O interface 308. The memory 306 can include a virtual machine discovery and identification application 310 and a database of virtual machines and corresponding parameters 312.

In operation, the processor 302 may execute the virtual machine discovery and identification application 310 stored in the memory 306. The virtual machine discovery and identification application 310 can include software instructions that, when executed by the processor, cause the processor to perform operations for virtual machine discovery and identification (e.g., the virtual machine discovery and identification application 310 can perform one or more of steps 102-110 described above and, in conjunction, can access and/or modify the VM and associated parameters database 312). The virtual machine discovery and identification application 310 can also operate in conjunction with the operating system 304.

Computer system 300 can be part of a switch or router. Computer system 300 can include, but is not limited to, a single processor system, a multi-processor system (co-located or distributed), a cloud computing system, or a combination of the above.

The information discovered during the virtual machine discovery and identification process can be stored in an application program database. The information can be used to show the topology of a network including the virtual machines (or other virtual entities). Also, the information can be used to help maintain an inventory of network elements.

The information corresponding to each VM can be assigned a unique ID number, which can be stored in the database. The unique ID number can be a UUID, which can be assigned by a hypervisor (e.g., VMware). The UUID can be obtained when the virtual machine discovery and identification system queries the hypervisor.

Alternatively, if a UUID is not available from a hypervisor or the like, the virtual machine discovery and identification system can use a hash function to create a UUID and store the UUID in a known location on the VM. Thus, if the VM is moved from one machine to another, the virtual machine discovery and identification system can check for the identification number in the known location and, if the identification number is present, the virtual machine discovery and identification system can determine that the VM has been previously discovered and identified.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for virtual machine discovery and identification.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A method for discovering and identifying a virtual machine in a network, the method comprising:

receiving, at one or more processors, information from the virtual machine of the network, the information including values of one or more of a time stamp, an Internet Protocol (IP) address, and a Medium Access Control (MAC) address;

comparing, at the one or more processors, the information received from the virtual machine of the network to stored virtual machine information retrieved from a database;

in response to the comparing, determining whether at least one value from the values of the virtual machine of the network matches a corresponding at least one value of a virtual machine associated with the stored virtual machine information, wherein the determining whether the at least one value from the values of the virtual machine of the network matches the corresponding at least one value of the virtual machine associated with the stored virtual machine information is based on determining the at least one value from the values of the virtual machine of the network and the corresponding at least one value of the virtual machine associated with the stored virtual machine information are within a given range from each other and the at least one value from the values of the virtual machine of the network and the corresponding at least one value of the virtual machine associated with the stored virtual machine information are not equivalent;

based on the determining, if the match is missing, determining the virtual machine as an unknown virtual machine;

in response to the determining the virtual machine of the network as the unknown virtual machine, adding the information received from the virtual machine of the network to the database and associating the stored virtual machine information retrieved from the database with the virtual machine of the network to generate an updated database; and utilizing the updated database to monitor the virtual network.

2. The method of claim 1, further comprising determining whether a unique identifier for the virtual machine of the network is available from a hypervisor associated with the virtual machine of the network and, when the unique identifier is available, receiving the unique identifier and storing the unique identifier in a database record associated with the virtual machine of the network.

3. The method of claim 2, further comprising generating the unique identifier, when the unique identifier is not available from the hypervisor, and storing the generated unique identifier at a known location in the virtual machine of the network.

4. The method of claim 3, wherein the generating includes using a hash function.

5. The method of claim 1, wherein the at least one value from the values of the virtual machine of the network is within a range of the corresponding at least one value of the virtual machine associated with the stored virtual machine information based on a determination that a received IP address of the information received from the virtual machine of the network is in a same subnet range as an IP address in the stored virtual machine information and further on a determination that a received time stamp of the information received from the virtual machine of the network is within a time range of a stored timestamp in the stored virtual machine information.

6. The method of claim 1, wherein at least two values of the virtual machine of the network are determined to match at least two corresponding values of the virtual machine associated with the stored virtual machine information.

7. A system for discovering and identifying virtual machines in a network, the system comprising:
one or more processors configured to perform operations including:
providing a representation of the virtual network;
receiving, at the one or more processors, information from a virtual machine of the network;
comparing, at the one or more processors, the information received from the virtual machine of the network to stored virtual machine information retrieved from a database;
in response to the comparing, determining whether at least one value from values of the virtual machine of the network matches a corresponding at least one value of a virtual machine associated with the stored virtual machine information, wherein the determining whether the at least one value from the values of the virtual machine of the network matches the corresponding at least one value of the virtual machine associated with the stored virtual machine information is based on determining the at least one value from the values of the virtual machine of the network and the corresponding at least one value of the virtual machine associated with the stored virtual machine information are within a given range from each other and the at least one value from the values of the virtual machine of the network and the corresponding at least one value of the virtual machine associated with the stored virtual machine information are not equivalent;
based on the determining, if the match is missing, determining the virtual machine of the network as an unknown virtual machine;
in response to determining the virtual machine of the network as the unknown virtual machine, adding the information received from the virtual machine of the network to the database and associating the stored virtual machine information retrieved from the database with the virtual machine of the network to generate an updated representation of the virtual network;
displaying the updated representation of the virtual network, including a topology of the virtual network; and
utilizing the updated representation of the virtual network to monitor the virtual network.

8. The system of claim 7, wherein the information from the virtual machine of the network includes one or more of a time stamp, an IP address, and a MAC address.

9. The system of claim 7, wherein the operations further comprise determining whether a unique identifier for the virtual machine of the network is available from a hypervisor associated with the virtual machine of the network and, when the unique identifier is available, receiving the unique identifier and storing the unique identifier in a database record associated with the virtual machine of the network.

10. The system of claim 9, wherein the operations further comprise generating the unique identifier, when the unique identifier is not available from the hypervisor, and storing the generated unique identifier at a known location in the virtual machine of the network.

11. The system of claim 10, wherein the generating includes using a hash function.

12. The system of claim 7, wherein the information received from the virtual machine of the network includes one or more of a time stamp, and an Internet Protocol (IP) address and wherein the at least one value from the values of the virtual machine of the network is within a range of the corresponding at least one value of the virtual machine associated with the stored virtual machine information based on a determination that the IP address is in a same subnet range as an IP address in the stored virtual machine information and further on a determination that a value of the time stamp is within a time range of a stored timestamp in the stored virtual machine information.

13. The system of claim 7, wherein at least two values of the virtual machine of the network are determined to match at least two corresponding values of the virtual machine associated with the stored virtual machine information.

14. A non-transitory computer readable medium having stored thereon software instructions that, when executed by a processor, cause the processor to perform operations including:
providing a representation of a network;
receiving, at one or more processors, information from a virtual machine of the network;
comparing, at the one or more processors, the information received from the virtual machine of the network to stored virtual machine information retrieved from a database;
in response to the comparing, determining whether at least one value from values of the virtual machine of the network matches a corresponding at least one value of a virtual machine associated with the stored virtual machine information, wherein the determining whether the at least one value from the values of the virtual machine of the network matches the corresponding at least one value of the virtual machine associated with the stored virtual machine information is based on determining the at least one value from the values of the virtual machine of the network and the corresponding at least one value of the virtual machine associated with the stored virtual machine information are within a given range from each other and the at least one value from the values of the virtual machine of the network and the corresponding at least one value of the virtual machine associated with the stored virtual machine information are not equivalent;

based on the determining, if the match is missing, determining the virtual machine of the network as an unknown virtual machine;

in response to determining the virtual machine of the network as the unknown virtual machine, adding the information to the database and associating the stored virtual machine information retrieved from the database with the virtual machine of the network to generate an updated representation of the virtual network;

providing the updated representation of the virtual network; and utilizing the updated representation of the virtual network to monitor the virtual network.

15. The non-transitory computer readable medium of claim 14, wherein the information includes one or more of a time stamp, an IP address, and a MAC address.

16. The non-transitory computer readable medium of claim 14, wherein the operations further comprise determining whether unique identifier for the virtual machine of the network is available from a hypervisor associated with the virtual machine of the network and, when a unique identifier is available, receiving the unique identifier and storing the unique identifier in a database record associated with the virtual machine of the network.

17. The non-transitory computer readable medium of claim 16, wherein the operations further comprise generating the unique identifier, when the unique identifier is not available from the hypervisor, and storing the generated unique identifier at a known location in the virtual machine of the network.

18. The non-transitory computer readable medium of claim 17, wherein the generating includes using a hash function.

19. The non-transitory computer readable medium of claim 14, wherein the information received from the virtual machine of the network includes values of one or more of a time stamp and an Internet Protocol (IP) address and wherein the at least one value from the values of the virtual machine of the network is within a range of the corresponding at least one value of the virtual machine associated with the stored virtual machine information based on a determination that the IP address is in a same subnet range as an IP address in the stored virtual machine information and further on a determination that the time stamp is within a time range of a stored timestamp in the stored virtual machine information.

* * * * *